US011997112B1

(12) United States Patent
Sanders (10) Patent No.: US 11,997,112 B1
(45) Date of Patent: May 28, 2024

(54) ACCESS CONTROL THREAT DETECTION

(71) Applicant: Wells Fargo Bank, N.A., San Francisco, CA (US)

(72) Inventor: Adam Sanders, Huntersville, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 189 days.

(21) Appl. No.: 17/092,057

(22) Filed: Nov. 6, 2020

(51) Int. Cl.
*H04L 9/40* (2022.01)

(52) U.S. Cl.
CPC .............................. *H04L 63/1416* (2013.01)

(58) Field of Classification Search
CPC . G06F 21/577; G06F 8/43; G06F 8/75; H04L 41/0893; H04L 41/16; H04L 43/18; H04L 63/1433; H04L 63/20
See application file for complete search history.

(56) References Cited

U.S. PATENT DOCUMENTS

| | | |
|---|---|---|
| 9,733,999 B1 | 8/2017 | Frost et al. |
| 10,055,266 B1 | 8/2018 | Sanders et al. |
| 10,121,025 B1 | 11/2018 | Rice |
| 10,262,156 B1 | 4/2019 | Sanders et al. |
| 10,315,056 B2 | 6/2019 | Klinke et al. |
| 2008/0120707 A1* | 5/2008 | Ramia ................. H04L 63/0861 726/5 |
| 2010/0063935 A1* | 3/2010 | Thomas ............... G06Q 50/265 705/325 |
| 2010/0132019 A1* | 5/2010 | Hardt ................... H04L 63/102 726/6 |
| 2012/0166818 A1* | 6/2012 | Orsini .................. H04L 9/3247 713/193 |
| 2013/0291094 A1* | 10/2013 | Sahoo ..................... G06F 21/45 726/19 |
| 2015/0081785 A1 | 3/2015 | Angelsmark et al. |
| 2015/0221151 A1* | 8/2015 | Bacco .................. H04W 12/64 340/5.83 |

(Continued)

FOREIGN PATENT DOCUMENTS

WO 2019033116 A1 2/2019

OTHER PUBLICATIONS

Mounnan et al, "Efficient Distributed Access Control Using Blockchain for Big Data in Clouds," ICWMC 2019 : The Fifteenth International Conference on Wireless and Mobile Communications, Jul. 2019, 11 pp.

(Continued)

*Primary Examiner* — Daniel B Potratz
*Assistant Examiner* — Matthias Habtegeorgis
(74) *Attorney, Agent, or Firm* — Shumaker & Sieffert, P.A.

(57) ABSTRACT

This disclosure describes techniques for threat detection within access control systems having multiple entitlement repositories. An example system includes a first entitlement repository, a second entitlement repository, a third entitlement repository, and a server. The server, in response to receiving an access request to access a service on a network, queries the first, second, and third entitlement repositories based on access characteristics of a user associated with the access request and receives responses from the first, second, and third entitlement repositories. When the responses from the first, second, and third entitlement repositories all match, the server provides authorization for the user to access the service in accordance with the responses.

16 Claims, 4 Drawing Sheets

(56) References Cited

U.S. PATENT DOCUMENTS

| | | | |
|---|---|---|---|
| 2015/0363590 A1* | 12/2015 | Patel | H04L 63/102 |
| | | | 726/17 |
| 2019/0050541 A1 | 2/2019 | Wright et al. | |
| 2019/0180010 A1* | 6/2019 | Ryu | H04L 9/3226 |
| 2019/0349332 A1* | 11/2019 | Murthy | H04L 63/02 |
| 2020/0065410 A1* | 2/2020 | Craig | G06F 16/27 |
| 2020/0380112 A1* | 12/2020 | Allen | G06F 21/44 |
| 2022/0075825 A1* | 3/2022 | Helms | G06Q 40/02 |
| 2022/0108331 A1* | 4/2022 | Thomson | G08B 13/22 |
| 2022/0383217 A1* | 12/2022 | Uemura | G06Q 10/0635 |

OTHER PUBLICATIONS

Paillisse et al., "Distributed Access Control with Blockchain," Cornell University, arXiv:1901.03568v11, Jan. 11, 2019, 7 pp.

* cited by examiner

ACCESS CONTROL THREAT DETECTION

TECHNICAL FIELD

This disclosure relates to detecting threats to access control of network applications.

BACKGROUND

Applications and services are often available on a network to be accessed by users having accounts within the network. Access to the applications and/or the services may be limited to user accounts with certain characteristics. This is sometimes referred to as access control. Access control uses the concept of 'least-privilege.' Least privilege describes the idea that an account should only have access to the minimal amount of resources needed to satisfy their job requirements. Granting superfluous access to an account increases risks posed to the applications and/or service and increases the potential impact from a malicious actor.

SUMMARY

This disclosure describes techniques for threat detection within systems and environments having multiple access control systems and/or multiple entitlement repositories. For example, a system includes multiple repositories that each store the rules and entitlements that control account access to network resources and/or functions. When a request for access to a resource is received by the access control system, the access control system pulls the rules and entitlements from the multiple repositories or requests authorization from each repository separately. Responses from the repositories are considered positive or negative votes for granting or denying the request. Out-voted repositories may be flagged for further analysis to identify weak and/or ineffective security. In some example embodiments, flagged repositories are temporarily or permanently removed from security checks until the vulnerability is addressed. In some examples, a repository may be flagged and/or removed proactively upon receiving a security report that a version of software upon which a repository relies has an existing/unpatched vulnerability. When the flagged repositories are analyzed, machine learning tools may be used to determine patterns and pinpoint causes and indicators of the vulnerability. This provides a technical solution to a technical problem of access control of applications and/or services within a network being compromised without being detected. As described below, the access control system monitors entitlement repositories to detect aberrant behavior indicative of one or more of the entitlement repositories being compromised and, in some example, performs remedial actions to reduce exposure to the network by the compromised entitlement repository.

An example system includes a first entitlement repository, a second entitlement repository, a third entitlement repository, and a server. The server, in response to receiving an access request to access a service on a network, queries the first, second, and third entitlement repositories based on access characteristics of a user associated with the access request and receives responses from the first, second, and third entitlement repositories. When the responses from the first, second, and third entitlement repositories all match, the server provides authorization for the user to access the service in accordance with the responses.

An example method includes, in response to receiving an access request to access a service on a network, querying first, second, and third entitlement repositories based on access characteristics of a user associated with the access request, and receiving responses from the first, second, and third entitlement repositories. The example method also includes, when positive ones of the responses from the first, second, and third entitlement repositories form a pre-determined quorum, identifying one of the first, second, and third entitlement repositories that provided the response that is negative, providing authorization for the user to access the service in accordance with the responses. And generating an incident record for the identified one of the first, second, and third entitlement repositories.

An example computer readable medium comprising instructions that, when executed, cause a server to, in response to receiving an access request to access a service on a network, query first, second, and third entitlement repositories based on access characteristics of a user associated with the access request. The instructions also cause the server to receive responses from the first, second, and third entitlement repositories. Additionally, the instructions cause the server to, when the responses from the first, second, and third entitlement repositories all match, provide authorization for the user to access the service in accordance with the responses.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
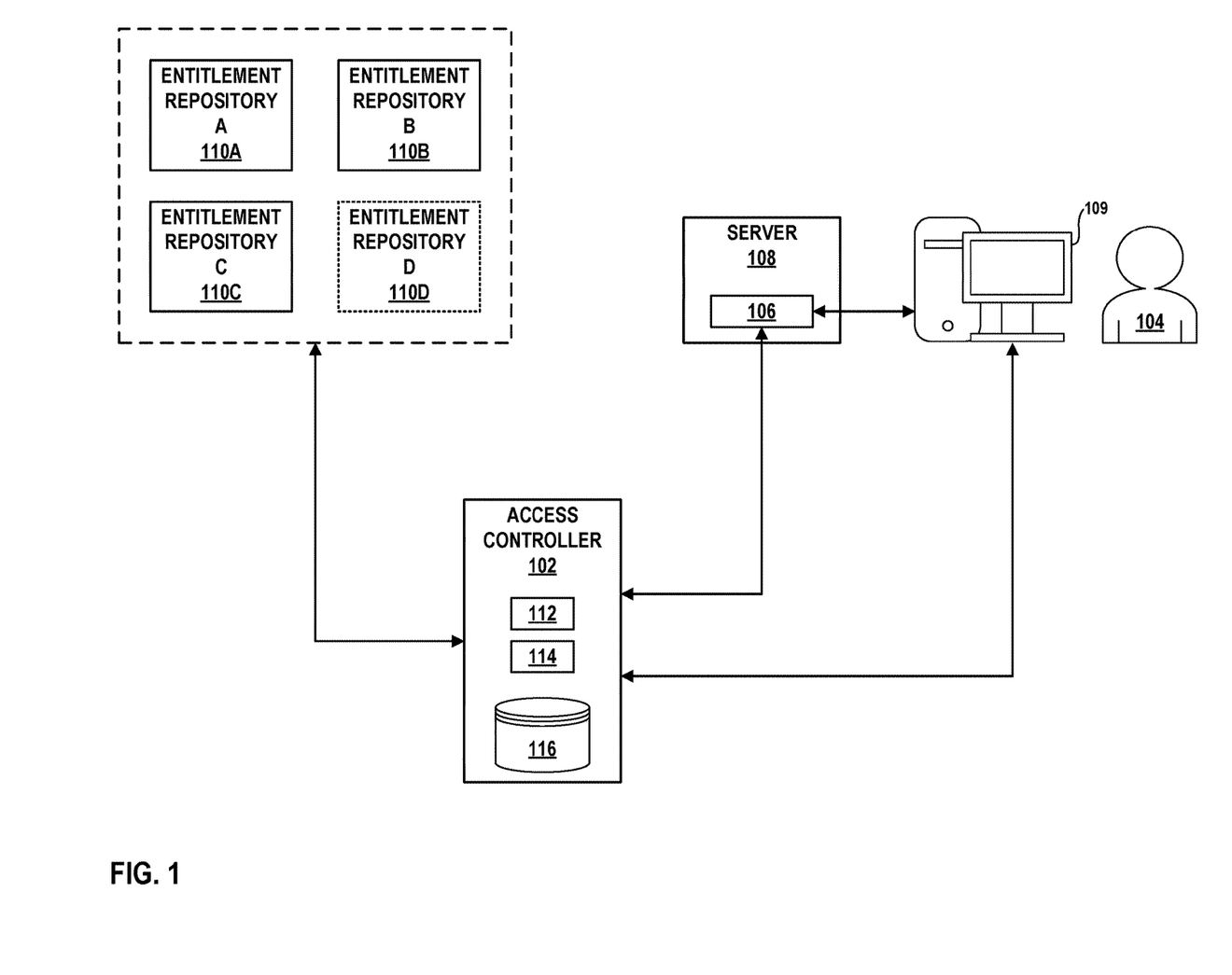
FIG. 1 illustrates a system including an access controller with automated threat detection operating in accordance with the teachings of this disclosure.

FIG. 1 illustrates an example system 100 including an access controller 102 with automated threat detection operating in according to the teachings of this disclosure. In the illustrated example, when a user 104 wants to access a service 106 operating on a server 108 in network 108 via a computing device 109 (e.g., a desktop computer, a laptop computer, a smart phone, a workstation, etc.), the service 106 communicates with access controller 102 to determine whether user 104 is authorized to access service 106.

When user 104 attempts to access service 106, service 106 requests authorization from access controller 102. The authorization request includes information about user 104 (e.g., credentials, one or more identifiers, etc.) and/or computing device 109 (e.g., a location, an Internet protocol (IP) address, a media access control (MAC) address, operating system, installed anti-virus software, etc.) to facilitate access controller 102 determining whether user 104 is authorized to access service 106 via computer device 109. For example, user 104 may have characteristics (e.g., determined via credentials and/or one or more identifiers, etc.) that support granting access to service 106 but computer device 109 may have characteristics that do not support granting access to service 106 (e.g., improper location and/or IP address, etc.). In some examples, service 106 may request authorization from access controller 102 every time user 104 attempts to access service 106. Service 106 receives a response indicative of whether to grant access to user 104. The authorization response may indicate that user 104 is not authorized to access service 106. The authorization response may indicate that user 104 is authorized to access service 106.

In some examples, when user 104 is authorized to access service 106, the authorization response may include a security token that defines boundaries of access to service 106 (e.g., group membership, claims, rights, entitlements, restrictions, etc.). In such examples, service 106 provides access according to the entitlements of user 106. In some examples, computing device 109 may directly communicate with access controller 102 to provide credentials (e.g., for authentication, etc.) and receive the security token (e.g., based on characteristics of user 104 and/or computer device 109) that defines access to service 106. In such examples, the security token may be included in the access request between computing device 109 and service 106 to facilitate determining access to service by user 104 on computing device 109. For example, user 104 may access multiple services on computer device 109 and the security token may be used to determine the characteristics of user 104 and/or computer 109 without performing lookups each time service 106 (or other services) is accessed.

Access controller 102 receives authorization requests from service 106 and generates authorization responses indicative of either denying access or permitting access. In the illustrated example, access controller 102 includes an authorization service 112 and an entitlement manager 114. Authorization service 112 determines whether user 104 is authorized to access service 106. Authorization service 112 may be coupled to one or more security databases that include security account information (e.g., identifiers, group membership, roles, etc.). Authorization service 112 uses security account information and information about user 104 provided by service 106 to determine what level of access is appropriate for user 104.

To determine whether user 104 is authorized to access service 106 via computing device 109, access controller 102 is communicatively coupled to entitlement repositories 110A-110D (collectively "entitlement repositories 110"). Entitlement repositories 110 are services that maintain information regarding entitlements that have been granted to specific accounts based on, for example, the security account information and information about user 104. Entitlement repositories 110 may also maintain information regarding entitlements characteristics of computing device 109. Entitlements may gate access to services (e.g., service 106, etc.) based on characteristics of user 104 and/or computing device 109 (sometime referred to as "access characteristics"), such as demographic data, employment data, training certificates, network characteristics, computing device characteristics, geographic location, and/or priority, etc.

Entitlement repositories 110 are segregated from each other such that the ability and authorization to access one entitlement repository (e.g. by an administrator, etc.) does not automatically provide ability and authorization to access the other entitlement repositories. Each of entitlement repositories 110 may maintain entitlements for a separate defined subset of the access characteristics. For example, entitlement repository A 110A may govern access to a document management system used by service 106 based on a role (e.g., job title, etc.) of user 104, entitlement repository B 110B may govern access to a database used by service 106 based on MAC address, and entitlement repository C 110C may govern access to communication interfaces to third party services based on software installed on computing device 109 (e.g., version of anti-virus software, browser being used for access service 106, etc.). In some examples, one or more repositories 110 may determine access to service 106 based on access characteristics associated with user 104 and other ones of repositories may determine access to service 106 based on access characteristics associated with computing device 109. In some examples, access characteristics are distributed among the entitlement repositories 110 such that access to a service (e.g., service 106, etc.) is controlled by multiple entitlement repositories 110. In some such examples, access characteristics are distributed among the entitlement repositories 110 such that access to a service (e.g., service 106, etc.) is controlled by at least three entitlement repositories 110.

In some examples, entitlement repositories 110 may maintain the same access characteristics, but may be separated (e.g., physically separated or network separated, etc.) such that a malicious actor compromising one of entitlement repositories 110 would not affect entitlements maintained by the other entitlement repositories 110. For example, entitlement repository D 110D may be an "air-gapped" repository in that the repository is stored off-network and has not been accessible or otherwise "at-risk" of being compromised by a malicious actor. In this example, entitlement repository D 110D may not be regularly used for authorization requests to control access to service 106 or systems or devices associated with service 106. Instead, entitlement repository D 110D may be brought online in response to a determination that one or more of entitlement repositories 110A-11C have been compromised, and thus, be used in place of the one or more comprised repositories. In further examples, entitlement repository D 110D, as the air-gapped repository, may be brought online in response to a predicted heightened risk of compromise of one or more of entitlement repositories 110A-11C. In other examples, entitlement repository D 110D may not be air-gapped, but may be a fourth online repository to enable rotation of the repositories used for authorization requests and/or enable automatic failover in the case that one of entitlement repositories 110A-11C is determined to have been compromised.

Upon authorization of user 104, entitlement manager 114, based on the characteristics of user 104 included in the authorization request and retrieved by the authorization service 112, queries or polls the corresponding entitlement repositories 110 to determine (a) whether user 104 is entitled to access service 106 based on the access characteristics maintained by the particular one of entitlement repositories 110, and (b) if authorized, what limitations to access are associated with a user with the access characteristics of user 104. The entitlement manager 114 may determine which entitlement repositories 110 to poll based on one or more of configuration settings, a lookup to determine which entitlement repositories 110 are associated with service 106, or historical analysis of which entitlement repositories 110 present the least threat or risk of compromise.

In the case that all entitlement repositories 110 are viable and active (i.e., none are believed to be compromised), entitlement manager 114 may poll all entitlement repositories 110. In the case where one of entitlement repositories 110 (e.g., entitlement repository C 110C) is predicted to have a heightened risk of compromise or is determined to have been compromised, entitlement manager 114 may automatically disable entitlement repository C 110C and poll the remaining entitlement repositories 110A, 110B, and 110D. As discussed above, in the case where entitlement repository D 110D comprises an air-gapped repository, entitlement repository 114 may only be able to poll entitlement repository D 110D in response to the disablement of one of the "regular" entitlement repositories 110A-11C. In other cases, entitlement repository 114 may select a subset (e.g., three of four) of entitlement repositories 110 at random and rotate which of the entitlement repositories 110 are polled for each access request in order to reduce the risk of a bad actor anticipating the multi-repository polling method and, thus, potentially obfuscate the source of entitlements being used for authorization requests.

The queried entitlement repositories 110 either authorize access or deny access. The responses from the repositories are considered positive or negative votes for granting or denying the authorization request. Entitlement manager 114 determines the authorization response based the votes from entitlement repositories 110. Entitlement manager 114 authorizes access to service 106 when positive votes correspond to all of the entitlements necessary to access service 106.

In some examples, when each of entitlement repositories 110 maintains different access characteristics, entitlement manager 114 authorizes access to service 106 when all of the entitlement repositories 110 vote to grant access. In some examples, when at least some of the access characteristics are maintained by multiple entitlement repositories 110 (e.g., redundant entitlement repositories 110 exist for at least some of the access characteristics, etc.), entitlement manager 114 authorizes access to service 106 when one of entitlement repositories 110 associated with each access characteristics votes to allow access. In some examples, when entitlement repositories 110 each maintain all necessary access characteristics, entitlement manager 114 authorizes access to service 106 when a threshold percentage of entitlement repositories 110 vote to grant access. In some such examples, some services may require a majority (e.g., 50%+1, etc.) of affirmative votes and some services may require a super majority (e.g., 66%+1) of affirmative votes for entitlement manager 114 to grant access to the service (e.g., based on the sensitivity of information accessible by the service, etc.). In some examples, the number of affirmative votes for entitlement manager 114 to grant access to the service is sometimes referred to as "a predetermined quorum." Based on the votes, entitlement manager 114 grants or denies access by user 104 to service 106 and, in some examples, delineates a level of access or available functionality of service 106 based on the access characteristics (e.g., via a security token, etc.).

Entitlement manager 114 analyzes the votes from the entitlement repositories 110. Regardless of the outcome of the vote (e.g., whether to grant or deny access to service 106), entitlement manager 114 determines whether any of the votes were anomalous. In some examples, a vote is anomalous when it is the opposite of the prevailing votes. For example, when access controller 102 is communicatively coupled to three entitlement repositories 110 and two of the three vote to authorize access (e.g., entitlement repository A 110A and entitlement repository B 110B) and one of the three votes to deny access (e.g., entitlement repository C 110C), entitlement manager 114 may determine that the one entitlement repository (e.g., entitlement repository C 110C) that cast the negative has provided an anomalous vote. An anomalous vote may be indicative of a misconfigured entitlement repository or an entitlement repository in which stored data has been changed without authorization, etc.

In response to determining that one or more of the entitlement repositories 110 have provided an anomalous vote, entitlement manager 114 generates an incident record to be store in an incident database 116. The incident record includes information to facilitate detecting a pattern that is indicative that the entitlement repository in question has been compromised and/or misconfigured. The incident record includes an identifier associated with the entitlement repository in question and metadata associated with the authorization request, such as the access characteristics associated with user 104 (e.g., all of the access characteristics, not just the access characteristics maintained by the entitlement repository in question, etc.), and the date and time of the access request, etc. In some examples, the incident record may include metadata from the entitlement repository in question relating to maintained access characteristics associated with user 104, such as the access characteristics associated with user 104 in the entitlement repository in question and/or dates and times of when access characteristics associated with the user where changed, etc.

Entitlement manager 114 may analyze the incident records within the incident database 116 to determine if there is a pattern indicative of improper configuration of one of the entitlement repositories. Entitlement manager 114 may perform an unsupervised machine learning technique, such as clustering (e.g., using portioning techniques, using density-based techniques, etc.), to detect patterns in the incident records that indicate that one of the entitlement repositories 110 should be flagged as possibly compromised. In response to determining that one of the entitlement repositories 110 (e.g., entitlement repository C 110C) has a heightened risk of compromise or is possibly compromised, entitlement manager 114 may generate a report. In some examples, entitlement manager 114 may perform automatic ameliorative action, such as disabling entitlement repository C 110C, rolling back recent changes to entitlement repository C 110C, and/or automatically rejecting authorization requests from users associated with suspect incident records, etc. In such examples, entitlement manager 114 may further request a previously air-gapped entitlement repository, e.g., entitlement repository D 110D, to be brought online in order to use entitlement repository D 110D in place of disabled entitlement repository C 110C for authorization requests.

In some examples, in response to determining that one of the entitlement repositories 110 is possibly compromised, entitlement manager 114 may receive records of all or a portion of authorization requests that required accessing the entitlement repositories in question to further analyze patterns of access that may be indicative of a compromise.

Additionally, or alternatively, in some examples, all access requests may be analyzed in real-time, with access requests associated with incident records being flagged as anomalous. That is, entitlement manager 114 may detect, in real-time and unsupervised, anomalies in access requests in streaming data (e.g., a real-time stream of access request data, etc.), where the incident record is a strong indicator of anomalous access and incident records are a subset of the streaming request data that are stored to be analyzed further.

Figure 2:
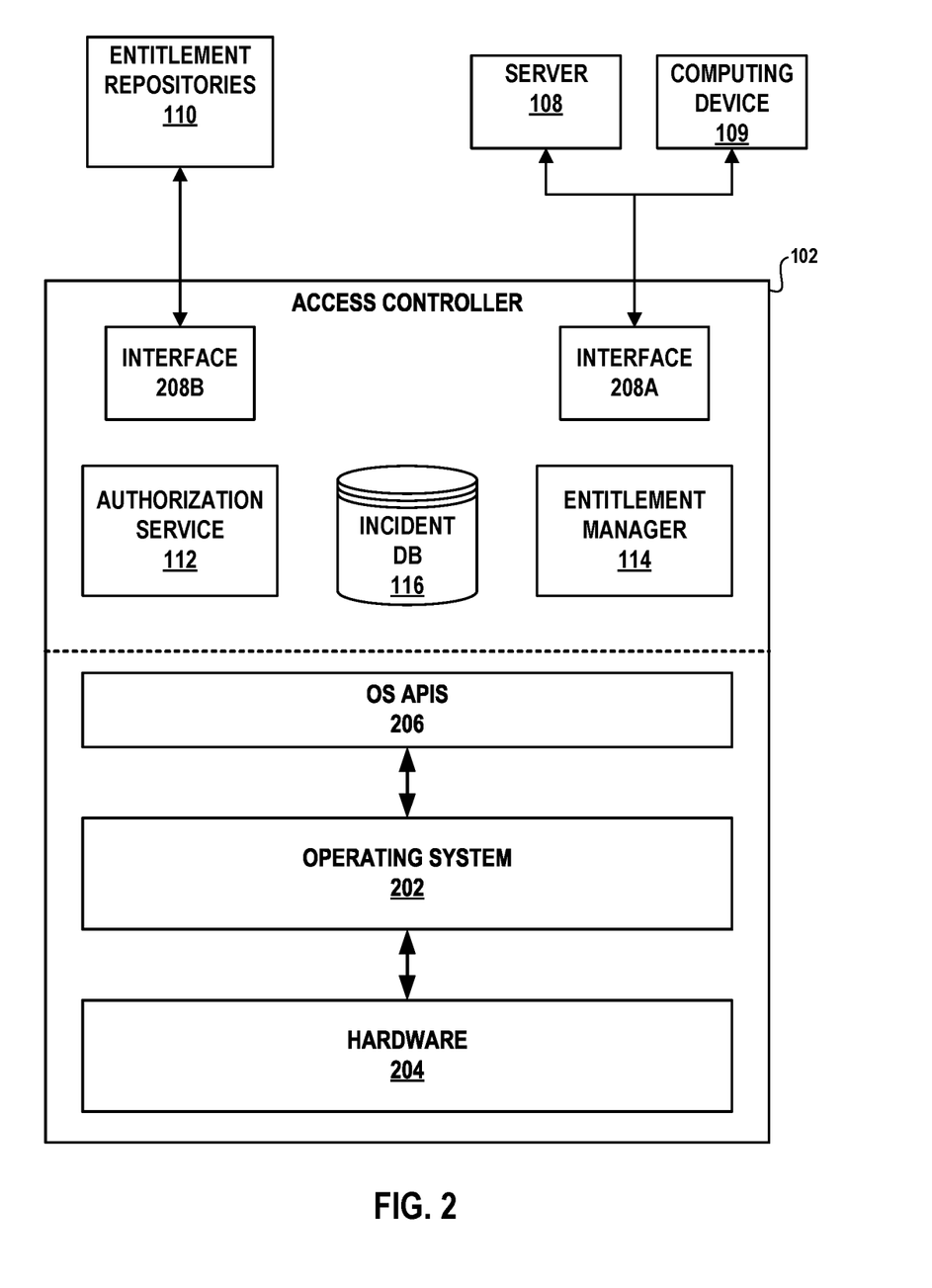
FIG. 2 is a block diagram of the access controller of FIG. 1.

FIG. 2 is a block diagram of the access controller 102 of FIG. 1 operating in accordance with the teachings of this disclosure. In the illustrated example, the access control server 102 includes operating system 202 for controlling device hardware resources 204 (e.g., processor(s), memory, network interfaces, etc.) and managing various system level operations, operating system APIs 206 used as interfaces between the operating system 202 and authorization service 112 and entitlement manager 114. In the illustrated example, access control server 102 also includes a database structure to host incident database 116. In the illustrated example, access controller 102 includes interfaces 208A and 208B. Interface 208A communicatively couples access controller 102 to server 108 and/or computer device 109 to obtain access characteristics, communicate access tokens, and/or communicate whether user 104 has permission to access service 106 via computing device 109.

Interface 208A may serve as an Application Programming Interface (API) to provide server 108 and/or computing device 100 a single interface to determine whether user 104 has permission to access service 106 on computing device 109 (e.g., instead of server 108 and/or computing device 109 connected to each of entitlement repositories 110 via separate APIs, etc.). Interface 208B is communicatively coupled to entitlement repositories 110 to determine whether user is entitled to access service 106 on computing device 109 in response to an access request. Interfaces 208A and 208B facilitate computing device 109 not directly connecting to any of the entitlement repositories 110 such that access to service 106 may be arbitrated by access controller 102.

Figure 3:
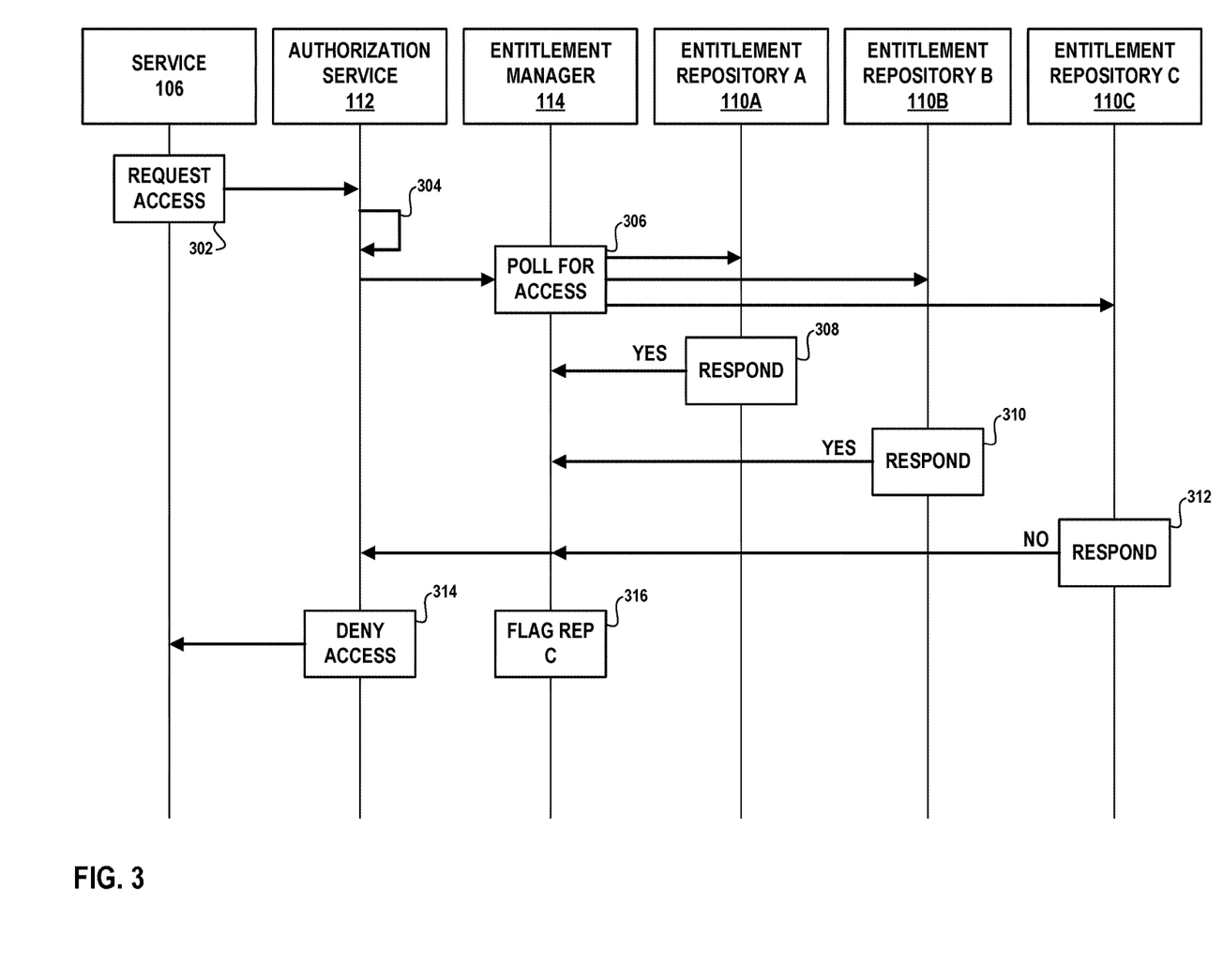
FIG. 3 illustrates detecting a potential threat in an access control system operating in according to the teachings of this disclosure.

FIG. 3 illustrates detecting a potential threat in an access control system operating in according to the teachings of this disclosure. Initially, service 106 requests access for user 104 in response to user 104 accessing service 106 operating on server 108 in a network environment (302). Service 106 may collect one or more access characteristics about user 104 and the computing device 109, such as a user ID, a password, a MAC address, a browser identifier, and/or a computer snap shop (e.g., a list of application and/or services executing on the computing device 109 that user 104 is using to access service 106, etc.), etc.) to use to generate other access characteristics and/or determine whether user 104 is authorized to access service 106. These access characteristics are included in the access request.

Authorization service 112 determines, based on the access characteristics included in the access request, whether user 104 is authorized to access service 106 (304). Authorization service 112 may retrieve more access characteristics, such as employment data (e.g., group membership, roles, job titles, etc.), training certificates, and/or network characteristics, etc. to facilitate entitlement repositories 110 determining whether user 104 is authorized to access service 106. Entitlement manager 114, using the access characteristics received in the access request and/or retrieved by authorization service 112, polls the entitlement repositories 110 (306).

In the illustrated example, entitlement repository A 110A responds by indicating that user 104 is authorized to use at least a portion of service 106 (308). Entitlement repository B 110B responds by indicating that user 104 is authorized to use at least a portion of service 106 (310). However, in the illustrated example, entitlement repository C 110C responds by indicating that user 104 is not authorized to use service 106 (312). Entitlement manager 114 collects these votes to determine whether user 104 is authorized to access service 106. In the illustrated example, because the votes from the entitlement repositories was not unanimously "yes," entitlement manager 114 determines that user 104 is not authorized to access service 106. Authorization service 112 sends a message to service 106 instructing service 106 to deny access to user 104 (314). Additionally, entitlement manager 114 flags entitlement repository C 110C for further analysis because entitlement repository C 110C was in the minority of the votes (316).

In the illustrated example, authorization service 112 sends a message to service 106 instructing service 106 to deny access to user 104 when the votes from entitlement repositories 110 are not unanimous (314). However, in some examples, authorization service 112 may send a message to service 106 instructing service 106 to allow access because a majority of entitlement repositories 110 voted to grant access. For example, entitlement repositories 110 may independently include the same type of entitlement information. In such an example when authorization service 112 may send a message to service 106 instructing service 106 to allow access because a majority of entitlement repositories 110 voted to grant access, entitlement manager 114 still flags entitlement repository C 110C for further analysis because entitlement repository C 110C was in the minority of the votes (316).

In response to the flag, entitlement manager 114 generates an incident record that includes information to facilitate detecting a pattern that is indicative of entitlement repository C 110C having a heightened risk of compromise or being compromised. In response to determining that entitlement repository C 110C has a heightened risk of compromise or is compromised, entitlement manager 114 may perform automatic ameliorative action, such as disabling entitlement repository C 110C and requesting that a previously air-gapped entitlement repository, e.g., entitlement repository D 110D, to be brought online in order to use entitlement repository D 110D in place of disabled entitlement repository C 110C for authorization requests.

Figure 4:
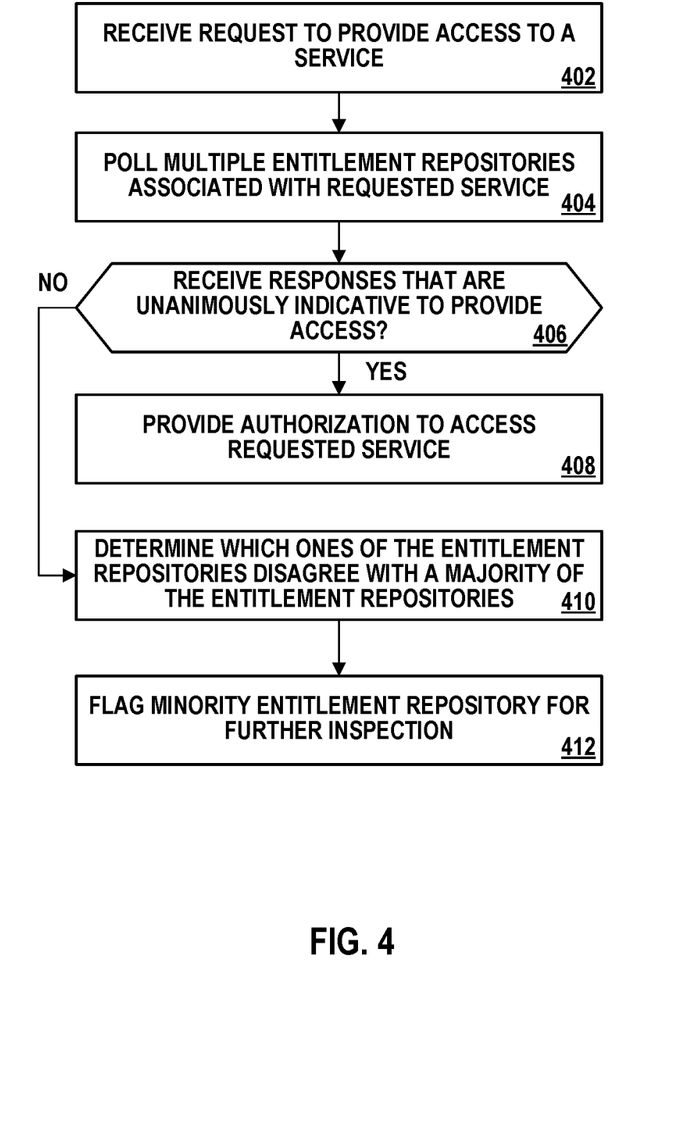
FIG. 4 is a flowchart of an example method to detect a potential threat in an access control system operating in according to the teachings of this disclosure.

FIG. 4 is a flowchart of an example method to detect a potential threat in an access control system operating in according to the teachings of this disclosure. Initially, entitlement manager 114 receives a request to access service 106 (402). In some examples, the access request includes access characteristics to provide to entitlement repositories 110 to determine whether the user that initiated the request is authorized to access service 106.

The entitlement manager 114 determines which entitlement repositories 110 to poll based on one or more of configuration settings, a lookup to determine which entitlement repositories 110 are associated with service 106, or historical analysis of which entitlement repositories 110 present the least threat or risk of compromise. Entitlement manager 114 polls multiple of entitlement repositories 110 associated with service 106 (404). In some examples, entitlement manager 114 polls at least three entitlement repositories 110 (e.g., entitlement repositories 110A-11C). In scenarios where all entitlement repositories 110 are viable and active (i.e., none are believed to be compromised), entitlement manager 114 may poll all entitlement repositories 110. In the case where one of entitlement repositories 110 (e.g., entitlement repository C 110C) is predicted to have a heightened risk of compromise or is determined to have been compromised, entitlement manager 114 may automatically disable entitlement repository C 110C and poll the remaining entitlement repositories 110A, 110B, and 110D. As discussed above, in the case where entitlement repository D 110D comprises an air-gapped repository, entitlement repository 114 may only be able to poll entitlement repository D 110D in response to the disablement of one of the "regular" entitlement repositories 110A-11C. In other cases, entitlement repository 114 may select a subset (e.g., three of four) of entitlement repositories 110 at random and rotate which of the entitlement repositories 110 are polled for each access request in order to reduce the risk of a bad actor anticipating the multi-repository polling method and, thus, potentially obfuscate the source of entitlements being used for authorization requests.

Entitlement manager 114 determines whether it receives responses from the polled entitlement repositories 110 that are unanimously indicative to provide access (406). When entitlement manager 114 determines it receives responses from the polled entitlement repositories 110 that are unanimously indicative to provide access ("YES" at 406), entitlement manager 114 provides authorization to access service 106 (408). When entitlement manager 114 determines it receives responses from the polled entitlement repositories 110 that are not unanimously indicative to provide access ("NO" at 406), entitlement manager 114 determines which ones of the entitlement repositories 110 disagree with a majority of the entitlement repositories (410). Entitlement manager 114 then flags entitlement repositories 110 that are in the minority for further review (412).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A system comprising:
   a server configured to execute a service;
   a first entitlement repository maintaining access characteristics;
   a second entitlement repository maintaining access characteristics that are identical to the access characteristics of the first entitlement repository;
   a third entitlement repository maintaining access characteristics that are identical to the access characteristics of the first entitlement repository; and
   an access controller configured to:
      in response to receiving an access request to access the service, query the first, second, and third entitlement repositories based on access characteristics of a user associated with the access request;
      receive responses from the first, second, and third entitlement repositories; and
      when the responses from the first, second, and third entitlement repositories do not all match:
         flag one of the first, second, and third entitlement repositories for which the received response does not match the received responses from the other two of the first, second, and third entitlement repositories;
         generate an incident report for the flagged one of the first, second, and third entitlement repositories for which the received response does not match the received responses from the other two of the first, second, and third entitlement repositories; and
         disable the flagged one of the first, second, and third entitlement repositories.

2. The system of claim 1, wherein when the responses from the first, second, and third entitlement repositories do not all match, the access controller is further configured to:
   deny authorization for the user to access the service.

3. The system of claim 1, wherein the incident report for the flagged one of the first, second, and third entitlement repositories is one of a plurality of incident reports for the flagged one of the first, second, and third entitlement repositories, and wherein the access controller is configured to:
   analyze the plurality of incident reports for the flagged one of the first, second, and third entitlement repositories; and
   based on the analysis, generate an alert.

4. The system of claim 1, further comprising a fourth entitlement repository being stored off of a network such that the fourth entitlement repository is not at-risk of being compromised, wherein the access controller is further configured to, in response to disabling access to the flagged one of the first, second, and third entitlement repositories:
   request that the fourth entitlement repository be brought online; and
   in response to receiving another access request to access the service on the network, query the first, second, and fourth entitlement repositories based on access characteristics of a user associated with the another access request.

5. The system of claim 1, further comprising a fourth entitlement repository, wherein the access controller is further configured to:
   in response to receiving the access request to access the service on a network, randomly select the first, second, and third entitlement repositories to query; and in response to receiving another access request to access the service on the network, rotate the selection of entitlement repositories to query, and query the second, third, and fourth entitlement repositories for the another access request.

6. The system of claim 1, wherein the first, second, and third entitlement repositories are isolated from each other such that modifying entitlement data in one of the first, second, or third entitlement repositories does not cause corresponding entitlement data to change in the other ones of the first, second, and third entitlement repositories.

7. The system of claim 1, further comprising a fourth entitlement repository storing first entitlement data associated with at least one of the access characteristics that are associated with second entitlement data stored by the first entitlement repository, the fourth entitlement repository being isolated from the first entitlement repository such that modifying the entitlement data in one of the first or fourth entitlement repositories does not cause corresponding entitlement data to change in the other one of the first or fourth entitlement repositories.

8. The system of claim 7, wherein the access controller queries and receives a response from the fourth entitlement repository, and wherein, when the responses from the first, second, and third entitlement repositories do not all match and the responses from the first and fourth entitlement repositories do not match, the access controller is configured to generate an incident report for the one of the first or fourth entitlement repositories that does not match a majority of the responses from the first, second, third, and fourth repositories.

9. A method comprising:
in response to receiving an access request to access a service executed by a server on a network, querying, by an access controller, first, second, and third entitlement repositories based on access characteristics of a user associated with the access request, wherein the first, second, and third entitlement repositories maintain the same access characteristics;
receiving, by the access controller, responses from the first, second, and third entitlement repositories; and
when the responses from the first, second, and third entitlement repositories do not all match:
flagging, by the access controller, one of the first, second, and third entitlement repositories for which the received response does not match the received responses from the other two of the first, second, and third entitlement repositories;
generating, by the access controller, an incident report for the flagged one of the first, second, and third entitlement repositories for which the received response does not match the received responses from the other two of the first, second, and third entitlement repositories; and
disabling, by the access controller, access to the flagged one of the first, second, and third repositories.

10. The method of claim 9, wherein when the responses from the first, second, and third entitlement repositories do not all match:
denying, by the access controller, authorization for the user to access the service.

11. The method of claim 9, wherein the incident report for the flagged one of the first, second, and third entitlement repositories is one of a plurality of incident reports for the flagged one of the first, second, and third entitlement repositories, the method further comprising:

analyzing, by the access controller, the plurality of incident reports for the flagged one of the first, second, and third entitlement repositories; and
based on the analysis, generating, by the access controller, an alert.

12. The method of claim 9, wherein a fourth entitlement repository is stored off of the network such that the fourth entitlement repository is not at-risk of being compromised, the method further comprising, in response to disabling access to the flagged one of the first, second, and third entitlement repositories:
requesting, by the access controller, that the fourth entitlement repository be brought online; and
in response to receiving another access request to access the service on the network, querying, by the access controller, the first, second, and fourth entitlement repositories based on access characteristics of a user associated with the another access request.

13. The method of claim 9, further comprising:
in response to receiving the access request to access the service on the network, randomly selecting, by the access controller, the first, second, and third entitlement repositories to query; and
in response to receiving another access request to access the service on the network, rotating, by the access controller, the selection of entitlement repositories to query, and querying the second, third, and fourth entitlement repositories for the another access request.

14. The method of claim 9, wherein the first, second, and third entitlement repositories are isolated from each other such that modifying entitlement data in one of the first, second, or third entitlement repositories does not cause corresponding entitlement data to change in the other ones of the first, second, and third entitlement repositories.

15. The method of claim 9, further comprising:
querying, by the access controller, a fourth entitlement repository storing first entitlement data associated with at least one of the access characteristics that are associated with second entitlement data stored by the first entitlement repository, the fourth entitlement repository being isolated from the first entitlement repository such that modifying the entitlement data in one of the first or fourth entitlement repositories does not cause corresponding entitlement data to change in the other one of the first or fourth entitlement repositories;
receiving, by the access controller, a response from the fourth entitlement repository; and
when the responses from the first, second, and third entitlement repositories do not all match and the responses from the first and fourth entitlement repositories do not match, generating, by the access controller, an incident report for the one of the first or fourth entitlement repositories that does not match a majority of the responses from the first, second, third, and fourth repositories.

16. A non-transitory computer readable storage medium comprising instructions that, when executed, cause processing circuitry of an access controller to:
in response to receiving an access request to access a service executed by a server on a network, query first, second, and third entitlement repositories based on access characteristics of a user associated with the access request, wherein the first, second, and third entitlement repositories maintain the same access characteristics;
receive responses from the first, second, and third entitlement repositories; and when the responses from the first, second, and third entitlement repositories do not all match:
   flag one of the first, second, and third entitlement repositories for which the received response does not match the received responses from the other two of the first, second, and third entitlement repositories;
   generate an incident report for the flagged one of the first, second, and third entitlement repositories for which the received response does not match the received responses from the other two of the first, second, and third entitlement repositories; and
   disable access to the flagged one of the first, second, and third entitlement repositories.

\* \* \* \* \*